(No Model.)
J. A. GRAHAM & J. W. KILE.
CAR WHEEL AND AXLE.
No. 601,648. Patented Apr. 5, 1898.
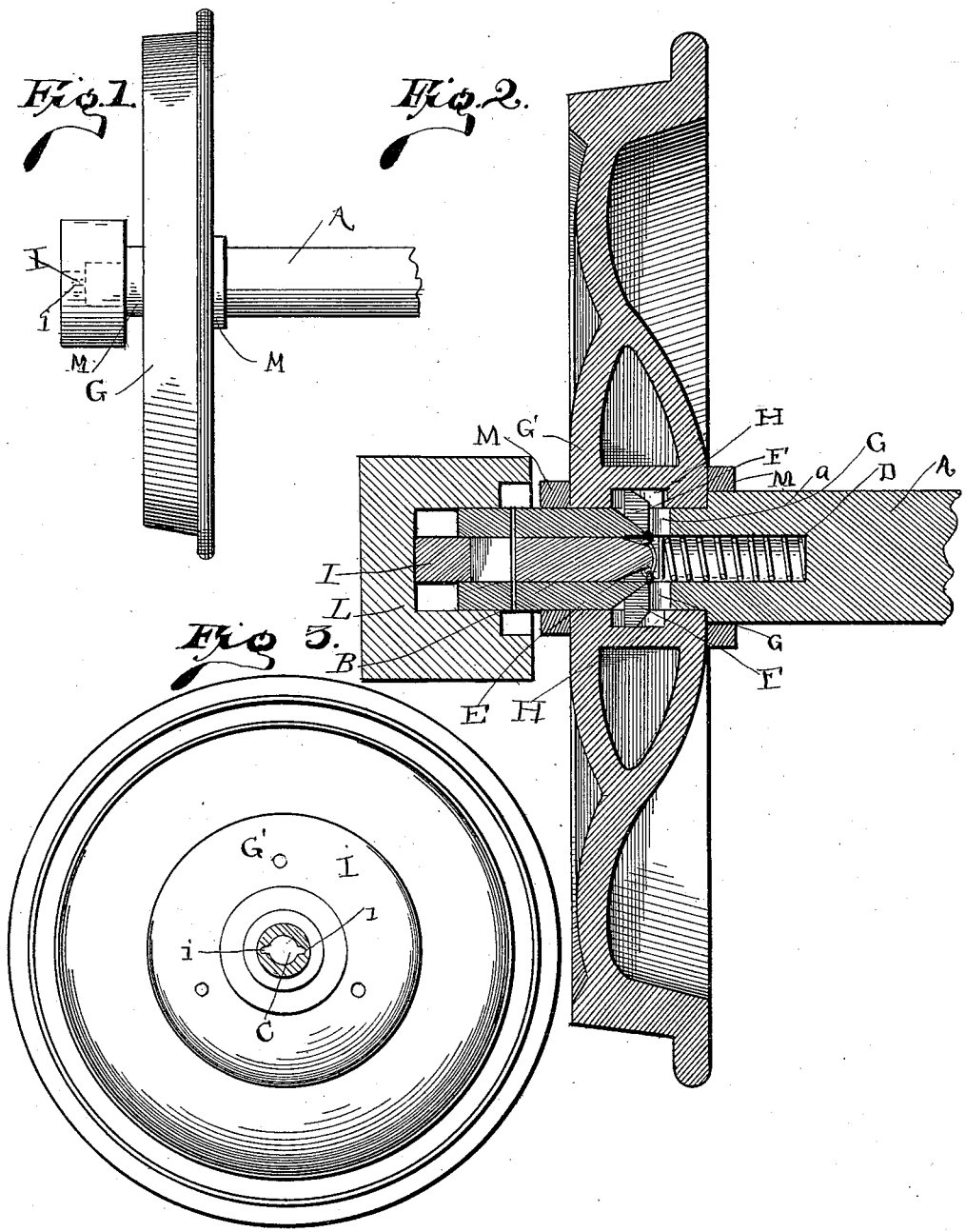
WITNESSES
INVENTORS
Jacob A. Graham
John W. Kile
By John Hedburn Attorney

UNITED STATES PATENT OFFICE.

JACOB A. GRAHAM AND JOHN W. KILE, OF DEERFIELD, VIRGINIA.

CAR WHEEL AND AXLE.

SPECIFICATION forming part of Letters Patent No. 601,648, dated April 5, 1898.

Application filed March 30, 1896. Serial No. 585,395. (No model.)

*To all whom it may concern:*

Be it known that we, JACOB A. GRAHAM and JOHN W. KILE, citizens of the United States, residing at Deerfield, in the county of Augusta and State of Virginia, have invented certain new and useful Improvements in Car Wheels and Axles; and we do hereby declare the following to be a full, clear, and exact description of the invention, such as will enable others skilled in the art to which it appertains to make and use the same.

This invention relates to certain new and useful improvements in car wheels and axles; and it has for its object, among others, to provide a simple and cheap construction whereby the wheels will be held rigidly to the axle while the car is traveling upon a straight track, but when rounding a curve the wheels will be caused to turn loosely upon the axle, and thus skidding of the wheels is prevented and undue wear on the wheel and axle is avoided and the car is permitted to travel at increased speed around a curve, which will be found a great desideratum.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is an elevation showing our improvement. Fig. 2 is a vertical longitudinal section, and Fig. 3 is a vertical cross-section.

Like letters of reference indicate like parts in the several views.

Referring now to the details of the drawings by letter, A designates the axle, which is provided with the shoulder $a$, against which the hub of the wheel is designed to engage to limit its endwise movement, as is ordinary in such cases. The car-axle is provided at its end with the longitudinal passage B, having the side grooves C disposed at diametrically opposite points, as shown, and within this bore is a spring D, while seated upon the spring is a spring-plate E, the opposite ends of which are pivotally connected in any suitable manner to pawls or dogs F, which work through openings G in opposite sides of the car-axle and communicating with the bore, and these openings are disposed at right angles to the recesses or grooves in the outer end of the axle, as shown.

G' is the wheel, having at diametrically opposite points in the wall of its bore or shaft-opening the recesses H, into which the pawls or dogs are designed to engage and hold the wheel fast upon the axle under normal conditions, as when traveling upon a straight track. The wheel may otherwise be of any well-known or approved form of construction.

I is a bolt or pin fitted to the bore of the axle and having the diametrically oppositely disposed flanges $i$ fitted to and adapted to engage in the grooves at opposite sides of the bore of the axle. Any suitable means may be provided for limiting the outward movement of this bolt—for instance, a wire or cap or analogous means L, secured thereto and to the axle, allowing sufficient inward movement, but preventing undue movement outward.

M are collars, one upon each side of the car-wheel, to exclude dust and dirt from the bearing.

O represents the axle-box, in which the axle A is so journaled as to permit a limited endwise play of said axle.

In practice the spring forces the bolt outward to its utmost limit, and the dogs are consequently thrown outward and engaged in the recesses in the bore of the car-wheel, so that the wheel will be held rigidly to the axle; but when rounding curves the centrifugal force exerted upon the car-body is communicated to the axle-box, which presses against the end of the bolt in the bearing, and the tendency of this action is to compress the spring and force the bolt inward, and as this takes place the spring-plate connecting the two pawls or dogs is forced into the bore upon the spring and the dogs or pawls are withdrawn into their recesses in the axle and out of their engagement with the recesses in the bore of the wheel, and the wheel is free to revolve loosely upon its axle. As the car again comes to the straight track pressure and weight upon the end of the bolt are withdrawn or removed, when the force of the spring throws the bolt outward and the dogs or pawls also outward, so they are thrown into the recesses in the bore of the wheel and the latter locked in position. The action is automatic and is brought about by the position of the car in approaching the curve and in leaving the same.

Modifications in details may be resorted to without departing from the spirit of the invention or sacrificing any of its advantages.

The shape of the dogs or pawls may be varied, as may also that of the bolt.

It will be understood, of course, that the axle-box commonly used in railway-cars is present and the axle running therein, and that the outer end of the box presses the pin into the axle when the car strikes a curve or an elevation in the track. When the car swings to the lower side of the track, the outside of the axle-box will press the pin into the axle, so that the dogs are disengaged from their notches, and when the car resumes its position on the horizontal or straight track the parts automatically assume their normal position and the pawls fall into engagement with their notches and thus hold the wheel, so that it revolves with the axle.

Having thus described the invention, what is claimed as new is—

1. The combination with a car-wheel, its axle and axle-box, of means for holding the wheel fast upon the axle and means actuated by the axle-box for automatically allowing the same to turn loosely thereupon when rounding a curve, substantially as described.

2. The combination with the car-wheel having its bore provided with diametrically-disposed recesses, of an axle having spring-actuated pawls adapted to engage said recesses, substantially as described.

3. The combination with the car-wheel having its bore provided with diametrically-disposed recesses, of an axle having spring-actuated pawls adapted to engage said recesses, and a spring within the bore of the axle, substantially as described.

4. The combination with the car-wheel having its bore provided with diametrically-disposed recesses, of an axle having spring-actuated pawls adapted to engage said recesses, and a spring within the bore of the axle, and an endwise-movable bolt adapted to actuate said pawls, substantially as described.

5. The combination with the car-wheel having its bore provided with diametrically-disposed recesses, of an axle having a longitudinal bore, a spring located therein, a spring-plate resting thereon and dogs pivotally mounted on said plate and projecting through recesses in the axle and engaging recesses in the bore of the wheel, substantially as described.

6. The combination with the car-wheel having its bore provided with diametrically-disposed recesses, of an axle having a longitudinal bore, a spring located therein, a spring-plate resting thereon and dogs pivotally mounted on said plate and projecting through recesses in the axle and engaging recesses in the bore of the wheel, and an endwise-movable bolt adapted to be automatically forced into the bore of the axle as the car approaches a curve, substantially as described.

In testimony whereof we have signed this specification in the presence of two subscribing witnesses.

JACOB A. GRAHAM.
JOHN W. KILE.

Witnesses:
T. A. PACE,
A. HENRY TOWBERMAN.